United States Patent
Good et al.

[15] 3,694,006
[45] Sept. 26, 1972

[54] HITCH COMBINATION FOR PREVENTING THE COUPLING OF TWO VEHICLES HAVING MISMATCHING VEHICLE CHARACTERISTICS

[72] Inventors: Arthur L. Good; Robert P. Reese, both of Elkhart, Ind.

[73] Assignee: Reese Products, Inc., Elkhart, Ind.

[22] Filed: Nov. 27, 1970

[21] Appl. No.: 93,187

[52] U.S. Cl. ................................. 280/507, 280/511
[51] Int. Cl. .............................................. B60d 1/06
[58] Field of Search ............................. 280/507, 511

[56] References Cited

UNITED STATES PATENTS

| | | | |
|---|---|---|---|
| 3,237,969 | 3/1966 | Geresy | 280/507 |
| 3,442,534 | 5/1969 | McCorkle | 280/511 |

*Primary Examiner*—Kenneth H. Betts
*Assistant Examiner*—Robert R. Song
*Attorney*—Oltsch & Knoblock

[57] ABSTRACT

A hitch combination which includes a hitch constituting a part of one vehicle and a coupler constituting a part of another vehicle. The one vehicle includes a first key device which is correlated to a certain characteristic of the vehicle. The other vehicle includes a second key device which is correlated to a certain characteristic of the other vehicle. The key devices of the vehicles have interfering parts which serve to prevent securement of the coupler to the hitch when there is a mismatch of vehicle characteristics. When there is a match of vehicle characteristics, the key devices of the vehicles cooperate so as to permit the securement of the coupler to the hitch.

16 Claims, 17 Drawing Figures

PATENTED SEP 26 1972
3,694,006
SHEET 1 OF 6
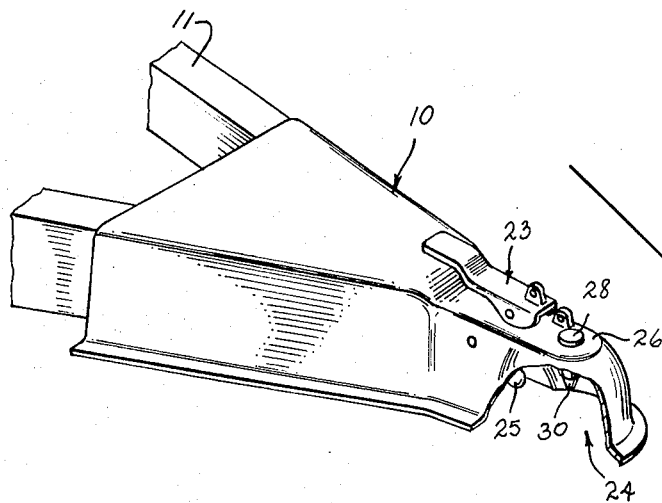
Fig.1
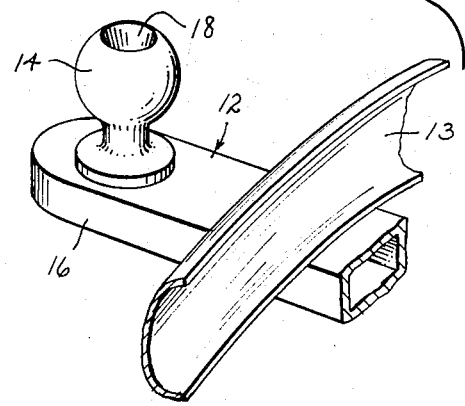
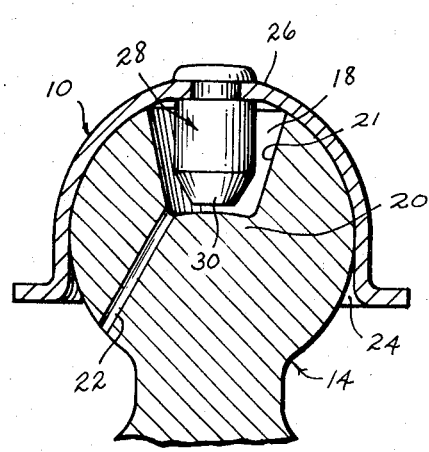
Fig.2
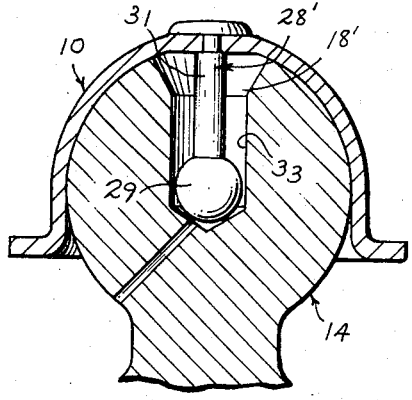
Fig.3
INVENTORS
ARTHUR L. GOOD &
BY ROBERT P. REESE
ATTORNEYS

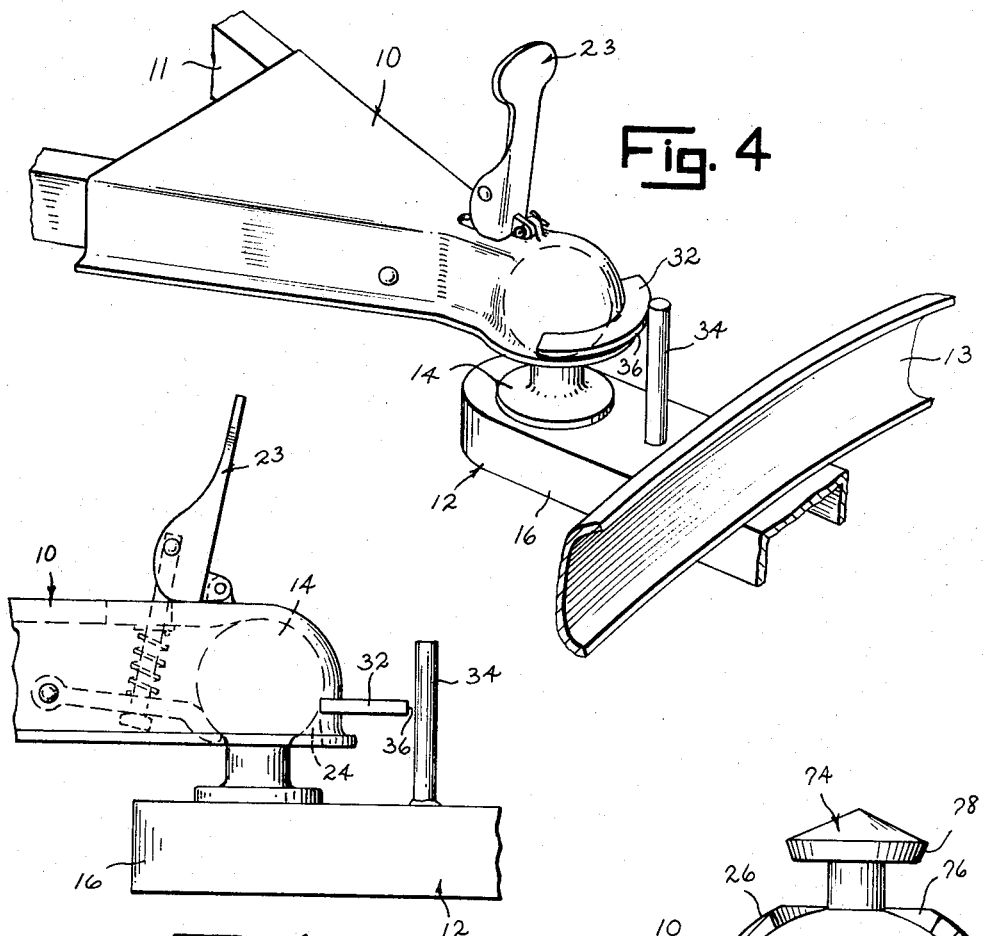
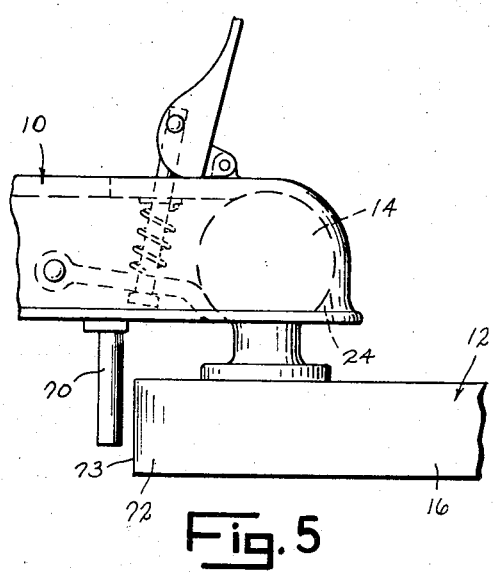
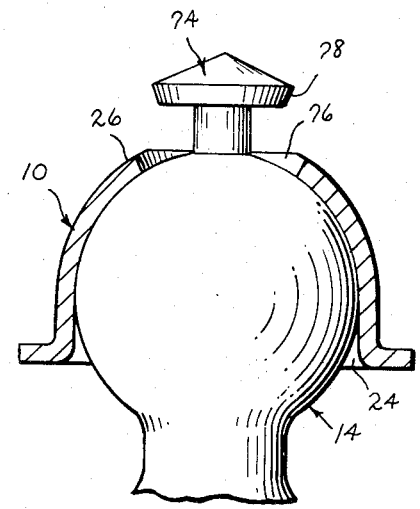

INVENTORS
ARTHUR L. GOOD &
ROBERT P. REESE
BY Oltsch & Knoblock
ATTORNEYS

PATENTED SEP 26 1972 3,694,006

INVENTORS
ARTHUR L. GOOD &
ROBERT P. REESE
BY
Oltsch & Knoblock
ATTORNEYS

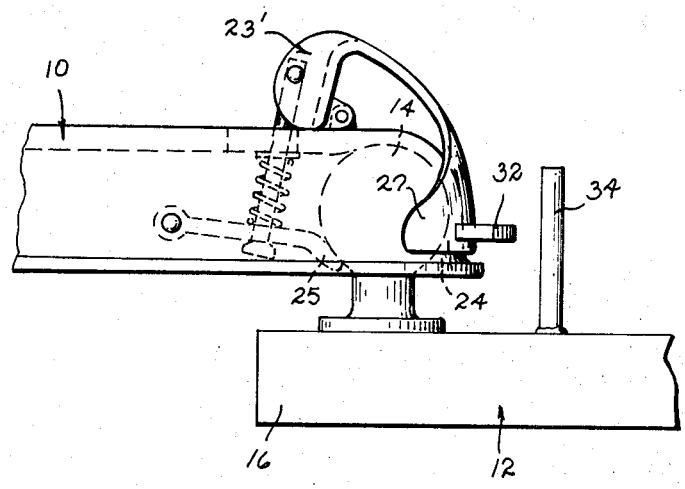

3,694,006

HITCH COMBINATION FOR PREVENTING THE COUPLING OF TWO VEHICLES HAVING MISMATCHING VEHICLE CHARACTERISTICS

BACKGROUND OF THE INVENTION

This invention relates to a hitch combination which prevents a mismatch of towed and towing vehicles and which will have specific application to preventing the overloading of a trailer hitch and the coupling of a coupler to an undersized hitch ball.

It has been reported that in approximately 20 percent of all accidents involving a vehicle and towed trailer a contributing factor to the accident can be traced to the trailer hitch. One condition which is believed to contribute to such a hitch-accident factor is the mating of trailers to hitches which are unsuited for the weight of the trailer. Another condition which is believed to contribute to the hitch-accident factor is the securement of a coupler to an undersized hitch ball which results in a loose fit between the ball and the coupler and which increases the likelihood of the coupler becoming disconnected from the hitch during its use.

In this invention, means is provided which prevents hitch and coupler securement when there is a mismatch of selected towed and towing vehicle characteristics.

SUMMARY OF THE INVENTION

The hitch combination of this invention includes a hitch which constitutes a part of one vehicle and a coupler which constitutes a part of another vehicle. Both such vehicles possess certain related characteristics. One vehicle includes a first key means which is correlated to a selected one of its vehicle characteristics. The other vehicle includes a second key means which is correlated to a selected one of its vehicle characteristics. The first key means includes a part which interferes with a part of the second key means when there is a mismatch of selected vehicle characteristics to prevent the securement of the coupler to the hitch. When there is a match of selected vehicle characteristics, the respective parts of the first and second key means cooperate so as to permit the securement of the coupler to the hitch.

This invention has application to ball and socket, clevis and pin, ring and pintle, and other similar hitches, and will allow users of the invention to regulate the size or type of vehicles which may be coupled by the use of the hitches.

A primary purpose of this invention is to prevent a mismatch of one or more characteristics of a towed vehicle and one or more related characteristics of a towing vehicle. The term "characteristics" as used in the description and claims of this invention includes reference to design criteria, such as hitch load capacity and towed vehicle weight, braking capacity, and coupler size and hitch ball size, for the vehicles, and also to aesthetic criteria, such as color and style, for the vehicles. The term "mismatch" as utilized in the description and claims of this invention, refers to an undesirable relationship between related characteristics of the towed and towing vehicles. One example of such a mismatch would be the coupling of a 3,000 pound trailer to a 1,000 pound maximum load hitch. Another example of a mismatch of vehicle characteristics could be the coupling of a coupler having a hitch ball socket diameter of 2.65 inches to a 1.875 inch diameter hitch ball. The term "match" as utilized in the description and claims of this invention refers to a desired relationship between related characteristics of the towed and towing vehicles. One such example of such a match would be the coupling of a 1,000 pound trailer to a hitch having a load capacity of 3,000 pounds. This invention would also have application in preventing the coupling of a trailer having brakes to a towing vehicle which does not have the facilities to accommodate such a trailer.

Accordingly, it is an object of this invention to provide a hitch combination for coupling two vehicles having desired characteristics.

Another object of this invention is to provide a hitch combination for two vehicles which prevents the coupling of a vehicle having one characteristic to another vehicle having a related but undesired characteristic.

Still another object of this invention is to provide a hitch combination which prevents a trailer from being connected to a hitch which does not have the load capacity to safely support the trailer.

Still another object of this invention is to provide a hitch combination which includes a coupler having a hitch ball socket from being secured to a hitch having an undersized hitch ball.

Still another object of this invention is to provide a hitch combination which will prevent mismatching of a towed vehicle with a hitch and which would have application to clevis and pin, ball and socket, ring and pintle and other similar hitches.

Other objects of this invention will become apparent upon a reading of the invention's description.

BRIEF DESCRIPTION OF THE DRAWINGS

FIG. 1 is a perspective view of a coupler and hitch in disconnected form showing one embodiment of the hitch combination of this invention.

FIG. 2 is a sectional view taken through the center of the ball socket of the coupler in FIG. 1 with the ball of the hitch fully received within the socket.

FIG. 3 is a sectional view taken through the center of the ball socket of a coupler with the ball of a hitch fully received therein illustrating a modified embodiment of the hitch combination shown in FIGS. 1 and 2.

FIG. 4 is a perspective view of a coupler and connected hitch illustrating another embodiment of the hitch combination of this invention.

FIG. 4a is a side elevational view of the hitch combination illustrated in FIG. 4.

FIG. 5 is a side elevation of a coupler and connected hitch illustrating another embodiment of the hitch combination of this invention.

FIG. 6 is a fragmentary view of a coupler in partial section with a hitch ball fully received therein illustrating another embodiment of the hitch combination of this invention.

FIG. 16 is a side elevational view of a coupler and hitch similar in construction to the hitch combination shown in FIGS. 4 and 4a except for a slight modification to the coupler locking device.

DESCRIPTION OF THE PREFERRED EMBODIMENTS

Figure 7:
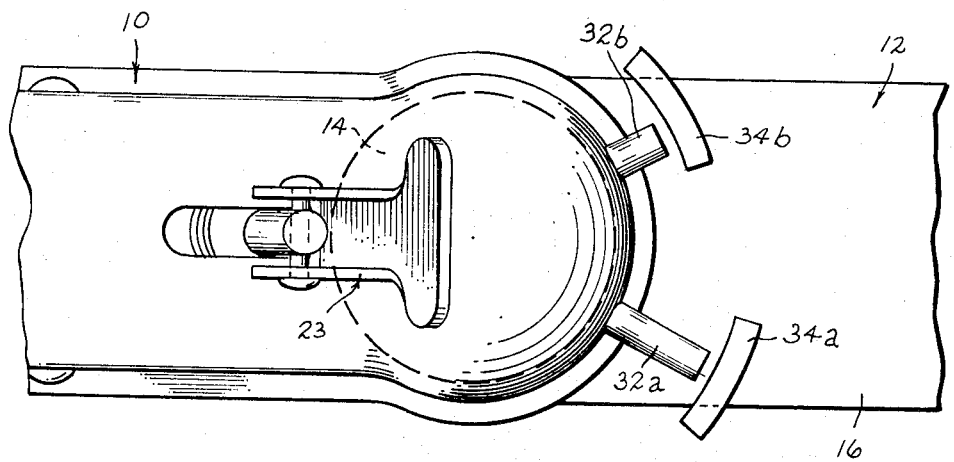
FIG. 7 is a top plan view of a coupler connected to a hitch illustrating another embodiment of the hitch combination of this invention.

The preferred embodiments illustrated are not intended to be exhaustive or limit the invention to the precise forms disclosed. They are chosen and described in order to best explain the principles of the invention and its application and practical use to thereby enable others skilled in the art to best utilize the invention.

The hitch combination illustrated in FIGS. 1 and 2 includes a coupler 10 and a hitch 12. Coupler 10 is connected to and constitutes a part of a vehicle 11, which for purposes of discussion, is a trailer having a certain characteristic such as a specified weight. Hitch 12 is mounted to and constitutes a part of another vehicle 13, which, for purposes of discussion, is the towing vehicle and includes a ball 14 which is fixed to platform 16 of the hitch. It is to be understood that vehicle 11 could be the towing vehicle and vehicle 13 the trailer if desired, and that hitch 12 may be a frame, bumper or any of a variety of different type hitches. Ball 14 has a cavity 18 formed therein. Cavity 18 is preferably of a generally frusto-conical shape with its center axis coinciding with the vertical axis of the ball. Cavity 18 is defined in part by a lower end wall 20 which is preferably slightly dome-shaped and which may have a passage 22 therein. Passage 22 has one end opening into cavity 18 adjacent the cavity side wall 21 and its other end opening below cavity 18 and exteriorly of the ball so as to define a drain through which any water collected within the cavity due to rain or snow may pass.

Coupler 10 may be of a construction like any of a variety of commercially available couplers which has a hitch ball socket 24 formed therein. The minimum transverse dimension of ball socket 24 of the coupler exceeds the maximum transverse dimension of hitch ball 14 so as to enable the coupler to be positioned over hitch ball 14 and the ball received within socket 24. Coupler 10 carries a locking device 23 having a shiftable lock member 25 which defines a part of ball socket 24 and which serves upon actuation of the locking device, in a manner well known in the art, to secure ball 14 within the coupler socket. Coupler 10 carries a depending pin 28. Pin 28 has its upper end riveted or otherwise fixedly attached to upper wall part 26 of the coupler and has its lower or free end 30 extending into ball socket 24. Pin 28 preferably has its axis located along the vertical center line of the ball socket.

Figure 13:
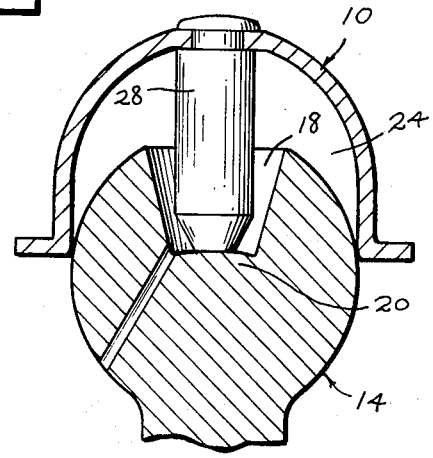
FIG. 13 is a fragmentary sectional view of the hitch combination of FIG. 2 showing a mismatch of vehicle characteristics.

The depth of cavity 18 in ball 14 and the length of pin 28 of coupler 10 for matched vehicle characteristics are so related that when the coupler is lowered over the hitch ball, pin 28 will project into cavity 18 with its end 30 located above lower end wall 20 of the cavity as illustrated in FIG. 2 so as to enable the ball to be fully received within socket 24 and secured to the coupler. To more fully explain this relationship between pin length and cavity depth it will be assumed that the pin length and ball cavity depth are both key means which are correlated to the vehicle characteristics of load capacity for hitch 12 and loaded weight for vehicle 11. Also, it will be further assumed that for a 1,000 pound maximum load hitch the hitch ball cavity depth is one-quarter inch; for a 3,000 pound maximum load hitch the ball cavity depth is one-half inch; and for a 5,000 pound maximum load hitch the ball cavity depth is three-quarter inch. With the hitch ball fully received within its coupler socket, the length of the coupler pin for a 1,000 pound trailer is of such a dimension that it will extend into the ball cavity of a 1,000 pound hitch and terminate just slightly above the bottom wall 20 of the cavity, as illustrated in FIG. 2. Also, the respective lengths of the coupler pins for a 3,000 pound trailer and a 5,000 pound trailer are such that the 3,000 pound trailer pin will extend into the ball cavity of a 3,000 pound hitch and the 5,000 pound trailer pin will extend into the ball cavity of a 5,000 pound hitch with each pin terminating just slightly above the bottom wall of its respective ball cavity. If an attempt were made to connect either a 3,000 or 5,000 pound trailer to a 1,000 pound hitch a mismatch would occur, and the coupler pin 28 would abut end wall 20 of hitch ball cavity 18, as shown in FIG. 13, to prevent the ball 14 from being fully received within coupler socket 24 and the coupler from being secured to the hitch. If an attempt were made to connect a 1,000 or 3,000 pound trailer to a 5,000 pound hitch, a match would occur and the coupler pin would extend into the ball cavity and terminate spacedly from the cavity end wall to permit the hitch ball to be fully received within the ball socket and the coupler to be secured to the hitch. Side wall 21 of cavity 18 of hitch ball 14 is preferably tapered so as to allow for angular variations between the axis of pin 28 and the vertical axis of the hitch ball during the coupling process and travel.

The modified form of the hitch combination illustrated in FIG. 3 is similar to the hitch combination illustrated in FIGS. 1 and 2 with the exception that cavity 18' of hitch ball 14 includes straight side wall parts 33, and pin 28' of coupler 10 includes a spherical head 29. Ball cavity 18' has a minimum transverse dimension, such as the minor diameter of an oval-shaped bore having its major diameter aligned with the longitudinal axis of the vehicle to which the hitch ball is mounted, which slightly exceeds the maximum transverse dimension or diameter of head 29 of pin 28'. Neck 31 of pin 28' is of a reduced dimension so as to allow for angular variations between the axis of the pin and the vertical axis of the hitch ball during the coupling process and travel. The minimum transverse dimension of ball cavity 18' and the maximum transverse dimension of pin head 29 are both key means which it will be assumed are correlated to the vehicle characteristics of hitch load capacity and coupler-connected weight respectively. Thus the minimum transverse dimension of cavity 18' in a hitch designed to support a 1,000 pound trailer will be less than the maximum transverse dimension of head 29 of pin 28' in a coupler-connected 3,000 pound trailer so as to prevent the pin of the coupler from entering the ball cavity of the hitch and thus prevent the ball from being received within the coupler socket. The pin 28' of a coupler-connected 1,000 pound trailer will fit within ball cavity 18' of a hitch designed for a 3,000 trailer since the pin will have a maximum transverse dimension which is less than the minimum transverse dimension of the ball cavity.

The embodiment of the hitch combination illustrated in FIG. 6 is similar in construction and operation to the hitch combination illustrated in FIG. 3. Hitch ball 14 carries a pin 74 which projects upwardly from the spherical top of the ball and which preferably lies along the vertical center line of the ball. Coupler 10 has an opening 76 formed in its upper wall 26. Opening 76 communicates with socket 24 and is generally centered over the center of socket 24. The maximum transverse dimension of pin 74 and the minimum transverse dimension of opening 76 are both key means correlated to related vehicle characteristics. Thus for vehicle characteristics such as trailer weight and trailer hitch capacity which are matching, that is the trailer weight is equal to or less than the hitch capacity, the minimum transverse dimension of opening 76 in the coupler will exceed the maximum transverse dimension of pin 74 so that the coupler can be lowered over the hitch ball with the ball fully received within socket 24 as illustrated in FIG. 6. In a mismatch of characteristics, that is when the trailer weight is greater than the hitch capacity, the maximum transverse dimension of pin 74 will exceed the minimum transverse dimension of coupler opening 76 so that pin 74 will not pass through opening 76 in the coupler, thus preventing the coupler from being connected to the hitch. Surface 78 of pin 74 is beveled as illustrated to accommodate differences in list and pitch between the towed and towing vehicles.

Referring to the embodiment of the hitch combination illustrated in FIGS. 4 and 4a, coupler 10 carries an extension member 32 which projects forwardly of the socket-defining portion of the coupler and which is preferably aligned with the longitudinal center axis of the coupler. Extension 32 could also be carried by the frame of vehicle 11 and project forwardly of the coupler. Hitch 12 includes an upright projection 34 which is carried by platform 16 and which is preferably positioned forwardly of and spaced from hitch ball 14. Extension member 32 is preferably positioned adjacent the lower edge of coupler 10 and projection 34 preferably extends above the center of the hitch ball. The extension member may constitute a part of the lower lip of the coupler or be attached to a part of the coupler locking mechanism, such as latch part 27 of the modified lock 23' shown as a component of the coupler 10 in FIG. 16. The center of ball socket 24 is that spacial location which coincides with the center of hitch ball 14 when the ball is locked within the ball socket. For matched vehicle characteristics, the distance between the center of hitch ball 14 and upright projection 34 is slightly greater than the distance between the center of socket 24 and the free end 36 of extension 32. Thus, coupler 10 may be connected to and pivoted relative to hitch 12 with no contact or interference taking place between extension 32 and projection 34. At least one of extension 32 and projection 34 is preferably arcuately shaped and is located a specific radial distance from the center of its locating hitch ball or socket and extends between 50° and 60° to each side of the longitudinal center line of its hitch or coupler carrying member.

Figure 14:
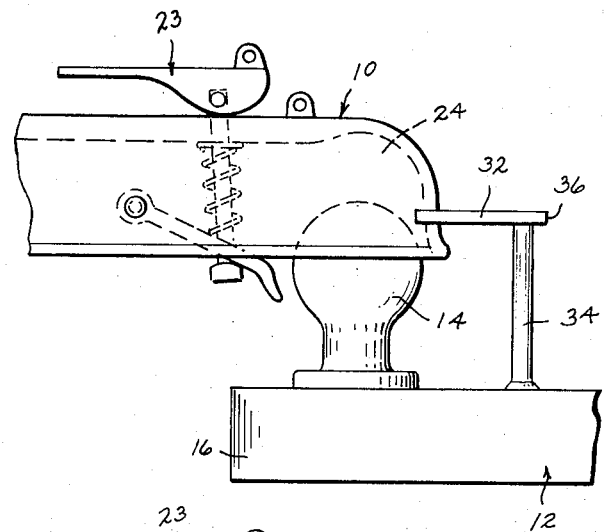
FIG. 14 is a fragmentary side elevation of the hitch combination of FIG. 4a showing a mismatch of vehicle characteristics.

In the embodiment illustrated in FIGS. 4 and 4a, the distance between the center of hitch ball 14 and projection 34 and the distance between the center of ball socket 24 and end 36 of extension 32 are both key means correlated to related vehicle characteristics. Thus, for vehicle characteristics such as trailer weight and hitch capacity which are mismatch, the distance between end 36 of extension 32 and the center of ball socket 24 will exceed the distance between projection 34 and the center of hitch ball 14 so that as the coupler is positioned over the hitch and brought down upon the hitch ball, extension 32 will abut projection 34 as shown in FIG. 14 and prevent the hitch ball from being fully received within the socket and the coupler from being connected to the hitch. Longitudinal misalignment between the vehicles 11 and 13 is compensated for by the arcuate configuration of either extension 32 or projection 34. For matching vehicle characteristics, the relative relationships between the extension 32 and projection 34 may be as shown in FIGS. 4 and 4a which permit the hitch ball 14 to be fully received within socket 24 without interference between the projection and the extension.

Figure 15:
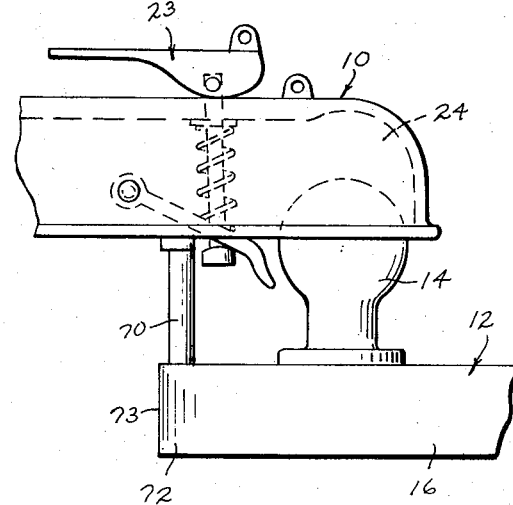
FIG. 15 is a fragmentary side elevation of the hitch combination of FIG. 5 showing a mismatch of vehicle characteristics.

The hitch combination illustrated in FIG. 5 is a modification of that embodiment illustrated in FIGS. 4 and 4a. Coupler 10 carries a depending projection 70 which is positioned rearwardly of socket 24 and preferably aligned with the longitudinal center line of the coupler. Platform 16 of hitch 12 extends rearwardly of hitch ball 14 and terminates in an extension portion 72. The distance between the vertical center axis of ball socket 24 and pin 70 and the distance between the vertical axis of hitch ball 14 and the end 73 of extension portion 72 of hitch platform 16 are both key means correlated to related vehicle characteristics. Thus when there is a match between characteristics, the coupler will receive hitch ball 14 as illustrated in FIG. 5 with pin 70 extending below the upper surface of platform 16 and rearwardly of extension portion 72 of the platform. When there is a mismatch of characteristics, the relationship between the socket and pin distance and the ball and platform extension distance will be such that pin 70 of coupler 10 will abut the upper surface of hitch platform 16 at extension member 72 and prevent the hitch ball from being fully received within socket 24 of the coupler as illustrated in FIG. 15.

The embodiment of the hitch combination illustrated in FIG. 7 utilizes the key means shown and described in FIGS. 4 and 4a to require a matching of two sets of related vehicles characteristics before the coupler can be secured to the hitch. Coupler 10 carries two extension members 32a and 32b which project forwardly of the socket-defining portion of the coupler. Hitch 12 includes two upright projections 34a and 34b which are carried by platform 16 and which are positioned generally forwardly of and spaced from hitch ball 14. Extension 32a and projection 34a cooperate as described for the embodiment illustrated in FIGS. 4 and 4a to provide one pair of key means which are correlated to one set of related vehicle characteristics such as trailer weight and hitch load capacity. Extension 32b and projection 34b are angularly displaced from extension 32a and projection 34a and also cooperate as described in the embodiment of FIGS. 4 and 4a to provide another pair of key means which are correlated to another set of related vehicle characteristics such as ball socket size and hitch ball size. If there is a mismatch of any one set of vehicle characteristics, there will be interference between an extension and projection which prevent the coupler from being secured to the hitch. If it is desired to require a matching of additional sets of related vehicle characteristics, additional cooperating extensions and projections can be added to the coupler and hitch.

Figure 8:
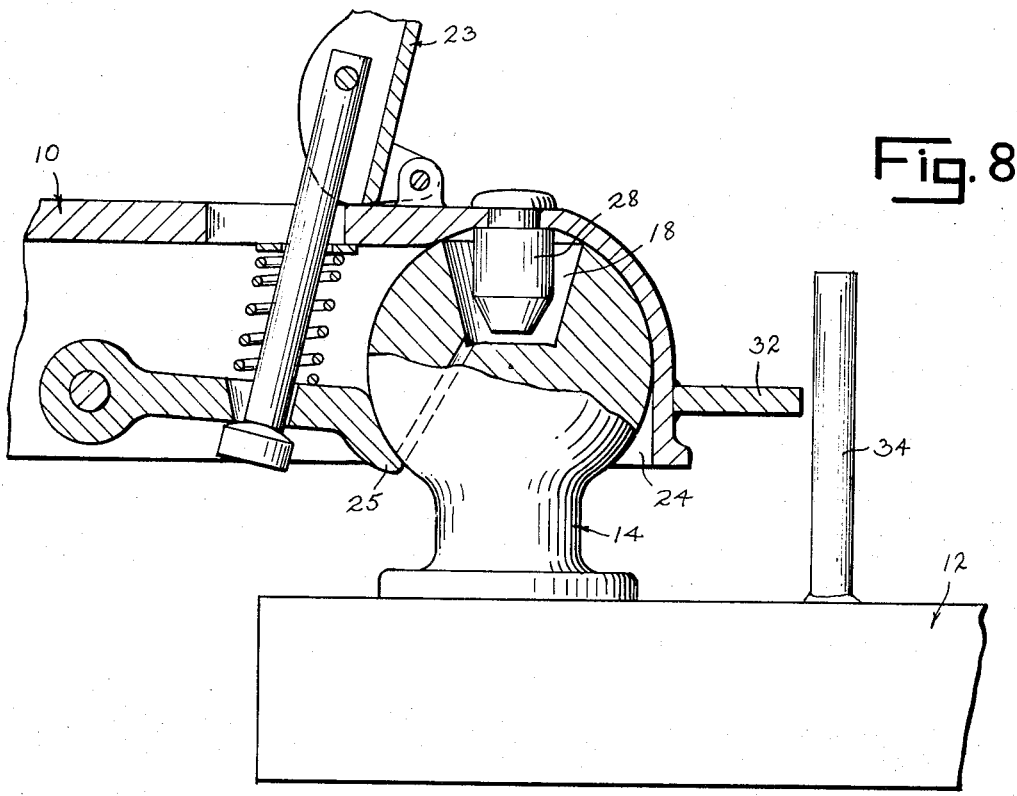
FIG. 8 is a side elevation of a coupler and hitch with parts in partial section illustrating another embodiment of this invention.

The hitch combination illustrated in FIG. 8 discloses another embodiment which, like FIG. 7, is double keyed and would require the matching of two sets of vehicle characteristics before coupler 10 could be secured to hitch 12. In this embodiment, pin 28 of coupler 10 and cavity 18 in hitch ball 14 are of the same construction and operate in the same manner as described in the embodiment of the hitch combination illustrated in FIGS. 1, 2 and 13. Additionally, extension 32 of coupler 10 and projection 34 of hitch 12 are of the same construction and operate in the same manner as described in the embodiment of the hitch combination illustrated in FIGS. 4 and 4a. Thus, pin 28 and cavity 18 are one pair of key means correlated to one set of vehicle characteristics, such as trailer weight and hitch capacity, and extension 32 and projection 34 are another pair of key means correlated to another set of vehicle characteristics, such as ball socket size and hitch ball size. While the hitch combination embodiment illustrated in FIGS. 1 and 2 has been combined with the hitch combination illustrated in FIGS. 4 and 4a to produce the combination of FIG. 8, it is apparent from the teachings of this invention that a double-keyed hitch combination can be obtained by utilizing the embodiment illustrated in either FIG. 3 or FIG. 6 in combination with the embodiment shown in FIGS. 4 and 4a. Additionally, the hitch combination illustrated in FIG. 5 could be combined with either of the hitch combinations illustrated in FIGS. 2, 4 and 4a, 3 or 6 to produce a double-keyed combination. Thus, it is apparent that various combinations of individual key means can be utilized to provide a multiple-keyed combination which requires a matching of two or more related sets of vehicle characteristics.

Figure 9:
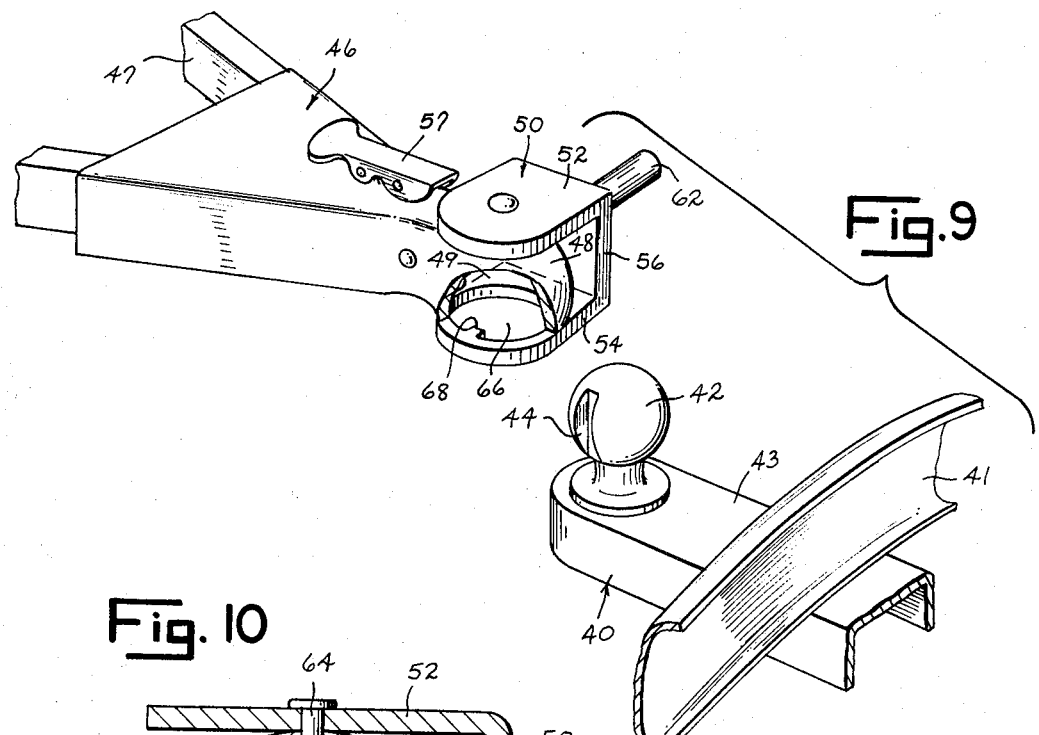
FIG. 9 is a perspective view of a coupler and hitch in disconnected form illustrating still another embodiment of the hitch combination of this invention.
Figure 10:
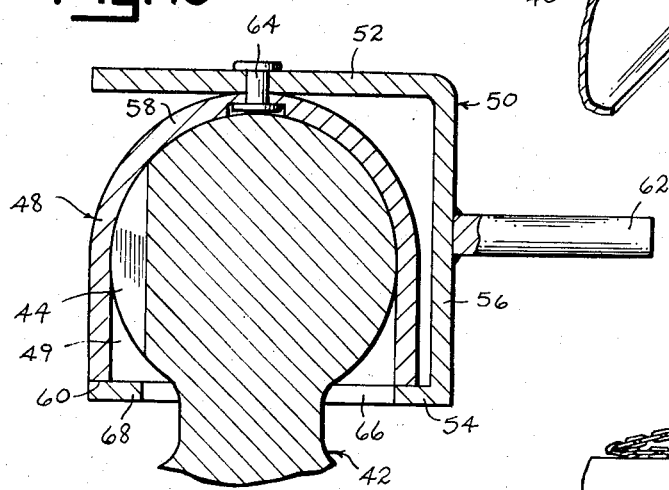
FIG. 10 is a sectional view taken through the center of the hitch ball illustrated in FIG. 9 and showing the coupler thereof connected to the hitch.

The embodiment of the hitch combination illustrated in FIGS. 9 and 10 represents another modification of this invention. Hitch 40 is connected to a vehicle 41 and carries a hitch ball 42 which is attached to the hitch platform 43. Hitch ball 42 has a vertically oriented slot 44 formed in one of its sides. Coupler 46 is connected to a vehicle 47 and includes a part 48 which defines a ball socket 49. Coupler 46 carries a standard locking means 50 which is actuated after the hitch ball is received within ball socket 49 to secure the coupler to the hitch. The socket-defining part 48 of coupler 46 carries a pivoted channel member 50. Channel member 50 includes a top wall 52 and a bottom wall 54 interconnected at corresponding end edges by a side wall 56. Channel member 50 is fitted over the end of coupler 46 with its top wall 52 positioned adjacently over upper wall portion 58 of coupler socket part 48 and with its bottom wall 54 positioned adjacently under lower edge 60 of the socket part. A handle 62 projects outwardly from side wall 56 of the channel member. A rivet 64, or similar securement means, which is carried by top wall 52 of the channel member and upper wall portion 58 of the coupler, serves to pivotally connect the channel member to the coupler. Channel member 50 is grasped by handle 62 and swung about its pivot connection in an arc around the forward end portion of coupler 46. Bottom wall 54 of channel member 50 includes an opening 66 which is of the same diameter and which registers with the lower opening in ball socket 49. Bottom wall 54 of the channel member includes a tab 68 which projects radially into opening 66. Tab 68 is sized so as to pass with slight clearance through slot 44 in hitch ball 42 as the coupler is lowered over the hitch ball. While tab 68 could be carried at lower edge 60 of coupler 46, vehicles 41 and 47 are normally misaligned during the coupling process, and therefore it is preferable to have the tab carried by pivoted channel member 50 so as to enable the tab to be swung arcuately about the forward end portion of the coupler and to be aligned with slot 44 in the ball. Tab 68 is designed to be positioned generally below the head of hitch ball 42 as shown in FIG. 10 once the hitch ball is fully received within ball socket 49 and secured thereto by actuation of lock 57 so as not to interfere with the pivotal movement between the coupler and hitch. The size of tab 68, either with respect to length or width, and the size of slot 44, either with respect to depth or width, are both key means correlated to related vehicle characteristics. Unless there is a desired match of such characteristics, tab 68 will not fit into slot 44. In order to adapt the hitch combination illustrated in FIGS. 9 and 10 to accommodate a double-keyed hitch combination, another tab may be carried by channel member 50 and an additional slot may be cut into ball 42. Additionally, tab 68 can be sized both as to width and length, and slot 44 sized both as to width and depth so as to provide a double-keyed relationship using a single tab.

Figure 11:
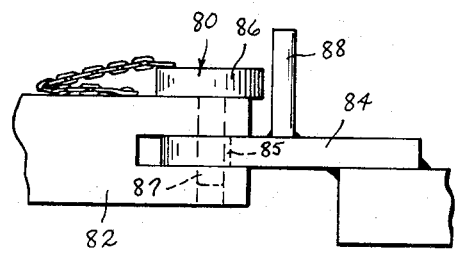
FIG. 11 is a side elevation of a clevis and pin hitch utilizing this invention.
Figure 12:
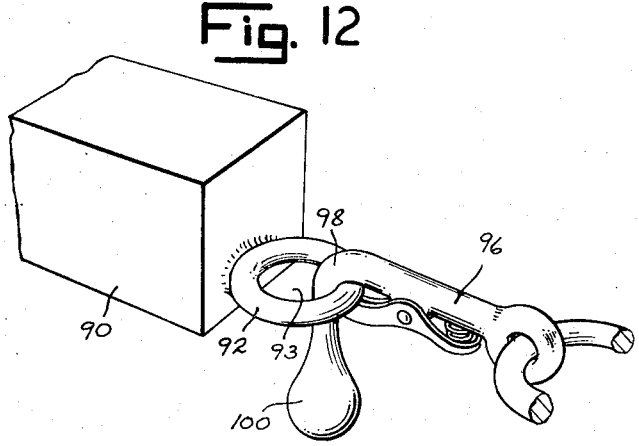
FIG. 12 is a perspective view of a ring and pintle hitch utilizing this invention.

In FIGS. 11 and 12, this invention is illustrated as being applied to hitches other than the ball and socket type hitches above described. FIG. 11 is illustrative of a clevis and pin hitch in which a lock pin 80 projects through registering bores in clevis 82 and tongue 84 and serves to couple the tongue to the clevis. Pin 80 includes a disk-shaped head 86 and shank 87. Tongue 84 carries a projection 88 which is positioned adjacent the end of and extends above clevis 82 when the tongue and clevis are interlocked by pin 80. The diameter of head 86 of pin 80 is so sized that should there be a mismatch between related characteristics of the vehicles to which tongue 84 and clevis 82 are attached, pin head 86 will abut projection 88 with shank 87 of the pin being prevented from entering the bore 85 in tongue 84.

FIG. 12 is illustrative of a ring and pintle type hitch in which a mount 90 carries a ring 92 and is secured to one vehicle. Hook 96 includes a lip 98 and is secured to another vehicle. Lip 98 of the hook has an enlarged tip 100 which is preferably generally spherical in shape. Should there be a mismatch between related characteristics of the vehicles to which ring 92 and hook 96 are attached, the maximum transverse dimension of hook tip 100 will exceed the minimum transverse dimension or diameter of opening 93 in ring 92 so as to prevent the lip of the hook from being inserted into the ring.

It is to be understood that the above descriptions are illustrative of particular and preferred embodiments of the invention and that the invention is not to be limited to the details therein given but that it may be modified within the scope of the appended claims. One such modification relative to the embodiment shown in FIGS. 1 and 2 would be to eliminate cavity 18 in ball 14 and instead form the ball with an upper flat which would be spaced a selected distance below wall portion 26 of coupler 10.

What we claim is:

1. In a hitch combination including a coupler constituting a part of a first vehicle and a hitch constituting a part of a second vehicle, one of said coupler and hitch including a ball having a maximum transverse dimension, the other of said coupler and hitch having a ball socket which has a minimum transverse dimension exceeding the maximum transverse dimension of said ball whereby said ball may be received within said ball socket, at least one of said coupler and hitch including securement means for locking said ball within said ball socket, said first vehicle having a characteristic, said second vehicle having a related characteristic, the improvement wherein said first vehicle includes a first key means forming a permanently fixed component of said first vehicle and said second vehicle includes a second key means forming a permanently fixed component of said second vehicle, said first key means being correlated to said first vehicle characteristic and said second key means being correlated to said second vehicle characteristic, said first key means including a part interfering with a part of said second key means so as to prevent said ball from being locked within said ball socket when there is a mismatch of said first and second vehicle characteristics, said first key means part cooperating with said second key means part so as to permit said ball to be locked within said ball socket when there is a match of said first and second vehicle characteristics.

2. The hitch combination of claim 1 wherein said first key means is correlated in size to said first vehicle characteristic and said second key means is correlated in size to said second vehicle characteristic.

3. The hitch combination of claim 1 wherein said first key means is correlated to said first vehicle characteristic by location relative to said ball and said second key means is correlated to said second vehicle characteristic by location relative to said ball socket.

4. The hitch combination of claim 1 wherein said ball has a cavity formed therein, said cavity constituting one of said first and second key means and having a depth correlated to one of said first and second vehicle characteristics, the other of said coupler and hitch carrying a pin projecting into said ball socket, said pin constituting the other of said first and second key means and having its length correlated to the other of said first and second vehicle characteristics, said pin extending into said cavity when said ball socket is positioned over said ball and engaging a bottom wall part of said cavity so as to prevent said ball from being locked within said ball socket when there is a mismatch of said first and second vehicle characteristics.

5. The hitch combination of claim 4 wherein said first vehicle characteristic is the weight of said first vehicle and said second vehicle characteristic is the load capacity of said hitch, said pin engaging said wall part of said cavity so as to prevent the securement of said coupler to said hitch when said first vehicle weight exceeds said hitch load capacity.

6. The hitch combination of claim 4 wherein said cavity is formed in the top of said ball and has a specific depth as measured from the top of said ball to said cavity wall part, said ball socket defined by an upper end wall, said pin having one end anchored to said upper end wall and extending from said wall downwardly into said socket, said pin having a length as measured from said upper end wall which exceeds said depth of said cavity when there is a mismatch of said first and second vehicle characteristics.

7. The hitch combination of claim 1 wherein said ball has a cavity formed therein, said cavity constituting one of said first and second key means and having a minimum transverse dimension correlated to one of said first and second vehicle characteristics, said other of said coupler and hitch carrying a pin projecting into said ball socket, said pin constituting the other of said first and second key means and having a maximum transverse dimension correlated to the other of said first and second vehicle characteristics, said pin being generally aligned with said cavity when said ball socket is positioned over said ball, the maximum transverse dimension of said pin exceeding the minimum transverse dimension of said cavity when there is a mismatch of said first and second vehicle characteristics so as to prevent said pin from entering said cavity and said ball from being locked within said ball socket.

8. The hitch combination of claim 7 wherein said first vehicle characteristic is the weight of said first vehicle and said second vehicle characteristic is the load capacity of said hitch, said maximum transverse dimension of said pin exceeding the minimum transverse dimension of said cavity when said first vehicle weight exceeds said hitch load capacity.

9. The hitch combination of claim 1 wherein said ball carries a pin projecting from the arcuate surface of said ball, said pin constituting one of said first and second key means and having a maximum transverse dimension correlated to said one of said first and second vehicle characteristics, said other of the coupler and hitch having an opening therein communicating with said ball socket, said opening constituting the other of said first and second key means and having a minimum transverse dimension correlated to the other of said first and second vehicle characteristics, said pin being generally aligned with said opening when said ball socket is positioned over said ball, the maximum transverse dimension of said pin exceeding the minimum transverse dimension of said opening when there is a mismatch of said first and second vehicle characteristics to prevent said pin from extending into said opening and said ball from being locked within said ball socket.

10. The hitch combination of claim 9 wherein said first vehicle characteristic is the weight of said first vehicle and said second vehicle characteristic is the load capacity of said hitch, said maximum transverse dimension of said pin exceeding the minimum transverse dimension of said opening when said first vehicle weight exceeds said hitch load capacity.

11. The hitch combination of claim 1 and a generally vertical projection carried by said one of the coupler and hitch and spacedly positioned from said ball, said projection constituting one of said first and second key means with the distance between the center of said ball and the projection being correlated to one of said first and second vehicle characteristics, a generally horizontal extension carried by the other of said coupler and hitch and having an end located outwardly from said ball socket, said extension constituting the other of said first and second key means with the distance between said end of the extension and the center of said ball socket being correlated to the other of said first and second vehicle characteristics, said center of said ball socket being that spacial location substantially coinciding with the center of said ball when said ball is locked within said ball socket, said projection and extension being radially aligned upon the positioning of said ball socket over said ball, said distance between the end of said extension and the center of said ball socket exceeding the distance between said ball center and said projection when there is a mismatch of said first and second vehicle characteristics to prevent said ball from being locked within said ball socket.

12. The hitch combination of claim 1 and a generally horizontal extension carried by said one of the coupler and hitch and having an end spacedly positioned from said ball, said extension constituting one of said first and second key means with the distance between said extension end and the vertical axis of said ball being correlated to one of said first and second vehicle characteristics, a generally vertical projection carried by said other of the coupler and hitch and spacedly positioned from said ball socket, said projection constituting the other of said first and second key means with the distance between said projection and vertical axis of the ball socket being correlated to the other of said first and second vehicle characteristics, said vertical axis of the ball socket being that locus intersecting the center of said ball when said ball is locked within said ball socket, said extension and projection being radially aligned upon positioning of said ball socket over said ball, said distance between the end of said extension and vertical ball axis exceeding said distance between said projection and the vertical axis of said ball socket when there is a mismatch of said first and second vehicle characteristics to prevent said ball from being locked within said ball socket.

13. The hitch combination of claim 1 wherein said ball has a vertical slot formed therein at one side of said ball, said slot constituting one of said first and second key means with the size of said slot being correlated to one of said first and second vehicle characteristics, said other of the coupler and hitch including a tab located adjacent the lower opening of said ball socket and projecting into said socket, said tab constituting the other of said first and second key means with the size of said tab being correlated to the other of said first and second vehicle characteristics, said tab adapted to extend into said ball slot with clearance as said other of the coupler and hitch is lowered over said one of the coupler and hitch with the ball being received within said socket when there is a match of said first and second vehicle characteristics, the size of said tab exceeding the size of said slot when there is a mismatch of first and second vehicle characteristics so as to prevent the ball from being locked within said ball socket.

14. The hitch combination of claim 1 wherein said first vehicle has X and Y characteristics and said second vehicle has W and Z characteristics, said first vehicle including a third key means in addition to its first key means, said first key means being correlated to said X characteristic, said third key means being correlated to said Y characteristic, said second vehicle including a fourth key means in addition to its second key means, said second key means correlated to said W characteristic, said fourth key means correlated to said Z characteristic, said first key means including a part interfering with a part of said second key means so as to prevent securement of said coupler to said hitch when there is a mismatch of said X and W characteristics, said third key means including a part interfering with a part of said fourth key means so as to prevent securement of said coupler to said hitch when there is a mismatch of said Y and Z characteristics.

15. The hitch combination of claim 1 wherein a portion of said ball constitutes one of said first and second key means parts, the other of said coupler and hitch carrying a pin projecting into said ball socket, said pin constituting the other of said first and second key means parts and having its length correlated to the other of said first and second vehicle characteristics, said pin abutting said ball when said ball socket is positioned over said ball so as to prevent said ball from being locked within said ball socket when there is a mismatch of said first and second vehicle characteristics.

16. In a hitch adapted for securement to a towing vehicle and carrying a hitch ball of a maximum transverse dimension, the improvement comprising key means permanently carried by said hitch and cooperable with associated key means permanently carried by selected couplers of a plurality of couplers, each of said plurality of couplers having a hitch ball socket of a minimum transverse dimension greater than the maximum transverse dimension of said hitch ball and each secured to a towed vehicle, said hitch carried key means for permitting said hitch ball to be received within the sockets of said selected couplers only to effect couplings between said hitch and selected couplers.

* * * * *